US012725151B2

(12) United States Patent
Amba et al.

(10) Patent No.: US 12,725,151 B2
(45) Date of Patent: Sep. 1, 2026

(54) INTENDED TRANSFER OF FUNDS IN A METAVERSE SYSTEM

(71) Applicant: Wells Fargo Bank, N.A., San Francisco, CA (US)

(72) Inventors: Vijayasree Amba, Hyderabad (IN); Ajay Vasant Kadam, Hyderabad (IN); Bhumika Peshwani, Uttar Pradesh (IN); Iyswarya Vaidyanathan, Hyderabad (IN); Reddicherla Sailalitha Kiranmaye, Telangana (IN); Shaik Abdul Shabaaz, Telangana (IN); Subir Mandal, Telangana (IN); Syed Ahmed Ali, Andhra Pradesh (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 90 days.

(21) Appl. No.: 18/781,236

(22) Filed: Jul. 23, 2024

(65) Prior Publication Data

US 2026/0030622 A1 Jan. 29, 2026

(51) Int. Cl.
*G06Q 20/38* (2012.01)

(52) U.S. Cl.
CPC ....... *G06Q 20/384* (2020.05); *G06Q 20/3829* (2013.01)

(58) Field of Classification Search
CPC ......................... G06Q 20/384; G06Q 20/3829
See application file for complete search history.

(56) References Cited

U.S. PATENT DOCUMENTS 9,973,424 B1 * 5/2018 Livesey .................. H04L 47/17
12,278,902 B1 * 4/2025 Dave ...................... G06V 40/20
2007/0198636 A1 * 8/2007 Inamoto .............. H04L 67/1082 709/203
2007/0276765 A1 * 11/2007 Hazel .................... G07F 19/206 705/71

(Continued)

FOREIGN PATENT DOCUMENTS

CN 115617438 A 1/2023
CN 116645164 A 8/2023

(Continued)

OTHER PUBLICATIONS

Jenny Williams, Backyard Treasure Hunting with Secret Codes, 2010, https://www.wired.com, 12 pages (Year: 2010).*

(Continued)

*Primary Examiner* — Patrick Mcatee
*Assistant Examiner* — Zesheng Xiao
(74) *Attorney, Agent, or Firm* — Merchant & Gould P.C.

(57) ABSTRACT

Examples described herein include conducting secure financial transactions in the metaverse using digital avatars. This is done by creating a payment avatar in the metaverse by inculcating a transaction's intent and displaying transaction packet data on one or more virtual billboards in a transaction route. The payment avatar can travel from the sender to the receiver's location on the metaverse platform and capture the transaction packet data from the one or more billboards using the one or more decryption keys. In this manner, funds can be securely transferred in the metaverse by preventing unauthorized access to the transaction packet data.

12 Claims, 5 Drawing Sheets

(56) References Cited

U.S. PATENT DOCUMENTS

| | | | | |
|---|---|---|---|---|
| 2018/0293578 | A1* | 10/2018 | Gardner | G06Q 20/401 |
| 2018/0350144 | A1* | 12/2018 | Rathod | H04L 51/10 |
| 2023/0359604 | A1 | 11/2023 | Doney | |
| 2024/0005579 | A1 | 1/2024 | Gonzalez Franco et al. | |

FOREIGN PATENT DOCUMENTS

| | | | |
|---|---|---|---|
| CN | 117078317 | A | 11/2023 |
| CN | 116308686 | B | 2/2024 |
| CN | 117635330 | A | 3/2024 |
| JP | 7451650 | B1 | 3/2024 |
| KR | 102600765 | B1 | 11/2023 |

OTHER PUBLICATIONS

Ciphers, Puzzles, & Codes Treasure Hunt, archieve 2024, https://www.queen-of-theme-party-games.com, 8 pages (Year: 2024).*

* cited by examiner

INTENDED TRANSFER OF FUNDS IN A METAVERSE SYSTEM

BACKGROUND

Use of digital transactions is consistently increasing because such transactions are faster, easier, and more convenient than traditional transaction methods. With the ongoing evolution of technology, financial institutions have adopted multiple modes of digital payments. Payment methods in metaverse-like environments attract customers by providing an interactive virtual world experience.

However, digital transaction methods attract fraudsters seeking to exploit weaknesses or develop new mechanisms for conducting fraudulent transactions. Fraudsters can modify the transaction or extract the customer's financial information for a transaction initiated in the metaverse. Further, for transactions initiated using digital avatars in the metaverse, there is a security concern about mimicking the digital avatar, leading to fraudulent transactions.

SUMMARY

Examples described herein include conducting secure financial transactions in the metaverse using digital avatars. This is done by creating a payment avatar in the metaverse by inculcating a transaction's intent and displaying transaction packet data on one or more virtual billboards in a transaction route. The payment avatar can travel from the sender to the receiver's location on the metaverse platform and capture the transaction packet data from the one or more billboards using the one or more decryption keys along the traverse path. In this manner, funds can be securely transferred in the metaverse by preventing unauthorized access to the transaction packet data.

According to a first aspect, a method of conducting a secure financial transaction in a metaverse platform includes receiving a request from a customer to conduct a financial transaction in the metaverse platform. A transaction packet including details of the financial transaction contained in the request can be created. A transaction route can be determined in the metaverse platform from a sender avatar representing the customer to a receiver avatar representing a receiver of the financial transaction. The details of the financial transaction in the transaction packet can be displayed in encrypted format on one or more digital billboards along the transaction route. A payment avatar can be created including one or more decryption keys for decrypting the details of the financial transaction in the transaction packet displayed on the one or more digital billboards. The payment avatar can be enabled to travel along the transaction route to retrieve the details of the financial transaction in the transaction packet displayed on the one or more digital billboards using the one or more decryption keys. The payment avatar can execute the financial transaction upon arriving at the receiver avatar.

The method can further include dividing the transaction packet into a plurality of transaction packet portions. Displaying the details of the financial transaction in the transaction packet in encrypted format on one or more digital billboards can include displaying each of the plurality of transaction packet portions on a separate billboard of the one or more billboards. A different decryption key of the one or more decryption keys can be used to obtain the transaction packet portion on each of the separate billboards. The transaction route can be determined using an artificial intelligence machine learning model. Creating the payment avatar can include creating the payment avatar in a partially-structured format and the payment avatar can obtain additional structure at each of the one or more billboards such that the payment avatar can be a complete structure upon arriving at the receiver avatar. The details contained in the request can include customer data relating to the customer and receiver data relating to the receiver. The method can further include determining an intent of the transaction based on the receiver data. The intent of the transaction can be embedded in the payment avatar. The method can further include identifying suspicious activity along the transaction route and modifying the transaction route in response to identifying the suspicious activity.

A system for conducting a secure financial transaction in a metaverse platform according to a second aspect disclosed herein can include an input-capturing module configured to receive a request from a customer to conduct a financial transaction in a metaverse platform The input-capturing module can be configured to create a transaction packet including details of the financial transaction contained in the request. A route determination module can be configured to determine a transaction route in the metaverse platform from a sender avatar representing the customer to a receiver avatar representing a receiver of the financial transaction. The route determination module can display the details of the financial transaction in the transaction packet in encrypted format on one or more digital billboards along the transaction route. An avatar creation module can be configured to create a payment avatar including one or more decryption keys for decrypting the details of the financial transaction in the transaction packet displayed on the one or more digital billboards along the transaction route. A transaction module can be configured to enable the payment avatar to travel along the transaction route to retrieve the details of the financial transaction in the transaction packet displayed on the one or more digital billboards using the one or more decryption keys. The transaction module can further be configured to cause the payment avatar to execute the financial transaction upon arriving at the receiver avatar.

The route determination module can further be configured to divide the transaction packet into a plurality of transaction packet portions. The route determination module can further be configured to display each of the plurality of transaction packet portions on a separate billboard of the one or more billboards. The transaction module can be configured to use a different decryption key of the one or more decryption keys to obtain the transaction packet portion on each of the separate billboards. The route determination module can be configured to determine the transaction route using an artificial intelligence machine learning model. The avatar creation module can be configured to create the payment avatar in a partially-structured format and the payment avatar can be configured to obtain additional structure at each of the one or more billboards such that the payment avatar is a complete structure upon arriving at the receiver avatar. The details contained in the request can include customer data relating to the customer and receiver data relating to the receiver. The input-capturing module can further be configured to determine an intent of the transaction based on the receiver data. The avatar creation module can be configured to embed the intent of the transaction in the payment avatar. The transaction module can further be configured to identify suspicious activity along the transaction route and the route determination module can be configured to modify the transaction route in response to identifying the suspicious activity.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Examples described herein include conducting a transaction in the metaverse.

In some examples, the transaction is conducted by creating a payment avatar and displaying transaction packet data on one or more billboards in a transaction route, enabling the payment avatar to travel by capturing the packet data using decryption keys. The concept includes a customer device communicating with a bank server and metaverse platform via a network.

For example, the customer device may be a mobile device, personal computer (PC), PDA, tablet, and the like capable of interacting with the bank server. The bank server includes an input-capturing component, an avatar creation component, an optimal route determination component, a transaction component, and a bank database. The bank database may include customer data associated with bank customers, bank account data, and the like. The customer data may include one or more customer details such as the customer's name, mobile number, customer address, age, identification data (for example, biometrics, unique ID), and the like. The bank account data may include account type, bank account number, available balance, and other details associated with one or more accounts of the customer. The metaverse platform may include a meta-cloud storage/space subscribed or purchased by one or more banks for conducting transactions using digital avatars. The functionality of each component is explained in further detail herein.

The drawings depict elements of this disclosure for a more complete understanding of the financial avatar system disclosed herein.

Figure 1:
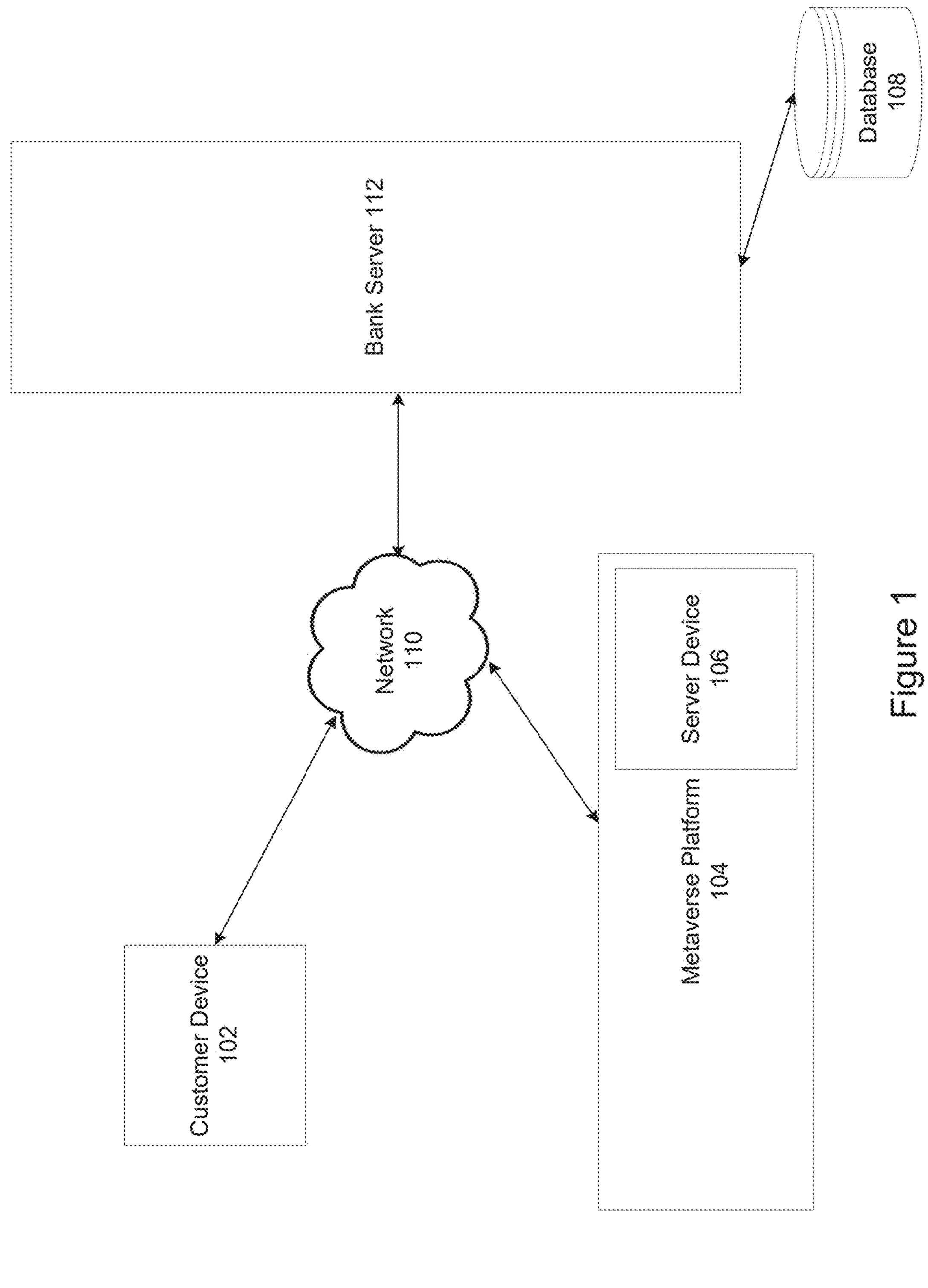
FIG. 1 depicts an exemplary system for transferring funds using a metaverse platform.

An exemplary system 100 for transferring funds using a metaverse platform is depicted in FIG. 1. A customer device 102 can be in communication with a bank server 112 and a metaverse platform 104 over a network 110. Customer device 102 can be, for example, a laptop computer, desktop computer or other computing device. Bank server 112 can store and transmit information for the system 100, some or all of which may reside in one or more databases 108 accessible to bank server 112, to the customer device 102 and metaverse platform 104 over network 110. Metaverse platform 104 can include a server device 106 and be in communication with the network for carrying out financial transactions requested by the customer device 102 with information provided by the bank server 112.

Figure 2:
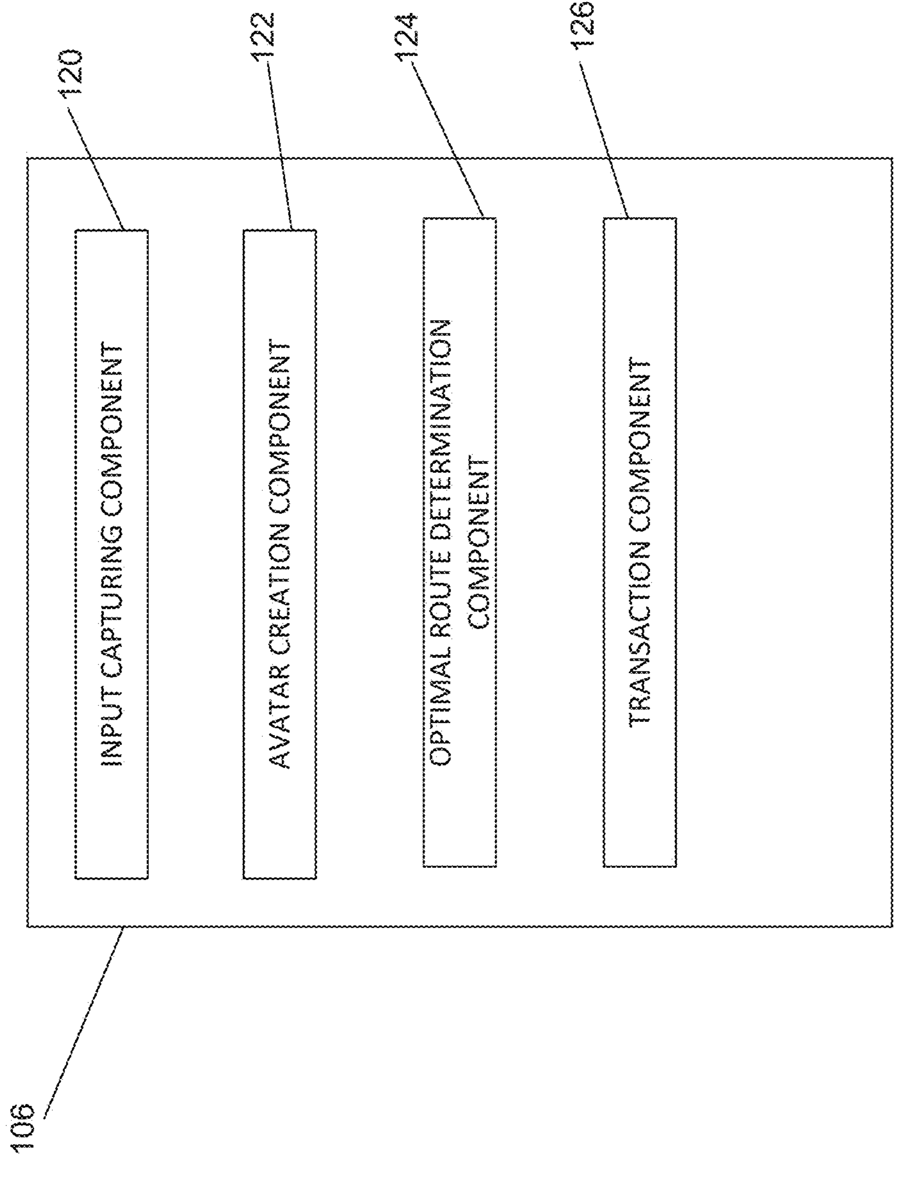
FIG. 2 depicts exemplary components of the server device of the system of FIG. 1.

FIG. 2 depicts exemplary components of the server device 106 of FIG. 1 for transferring funds using the metaverse platform 104 of FIG. 1. These components may be digitally stored within server device 106 and include an input-capturing component 120, an avatar creation component 122, an optimal route determination component 124 and a transaction component 126.

The input-capturing component or module 120 is configured to receive a customer request initiated on customer device 102 for conducting a transaction on the metaverse platform 104. For instance, the bank customer may initiate the request to transfer funds from the customer's bank account to a beneficiary/receiver by logging into an online banking portal or mobile bank application using the customer's device 102. The input-capturing component 120 is further configured to receive customer input comprising receiver data, transaction data, and the like. The receiver data may include the receiver's address, bank account number, bank IFSC code, and the like. The transaction data may include transaction type (e.g., scheduled or real-time) and one or more details related to the transaction request.

The input-capturing component 120 is configured to create a transaction packet using the receiver data, transaction data, and the like. The input-capturing component 120 is further configured to determine the intent of the transaction by analyzing the receiver data. For example, the intent of the transaction may include the transaction purpose and unique identification (ID) associated with a receiver's digital avatar.

The avatar creation component or module 122 is configured to create a payment avatar by embedding the intent of the transaction into the payment avatar. The payment avatar may be a digital avatar capable of traveling from a sender/customer to the receiver in the metaverse. For instance, the payment avatar may be created at a sender avatar associated with the customer and travel towards a receiver avatar associated with the beneficiary/receiver of the transaction. The payment avatar may be created in an incomplete/partially structured form by embedding the intent of the transaction and one or more decryption keys to decrypt the transaction packet data. In one embodiment, the payment avatar may be created using an onion-layered structure with multiple layers. Each higher layer of the onion-layered structure may comprise one or more private keys to decrypt the one or more decryption keys stored in the lower layers.

The optimal route determination component or module 124 is configured to determine an optimal transaction route for the payment avatar using an Artificial Intelligence (AI) and/or Machine Learning (ML) model. The optimal transaction route may be a virtual route in the metaverse platform indicating the travel path from the sender avatar to the receiver avatar. The optimal-route determination component 124 is further configured to display the transaction packet data on one or more billboards on the transaction route on the metaverse. The transaction packet data may be displayed on one or more billboards in an encrypted form.

The transaction component or module 126 is configured to enable the payment avatar to travel from the sender avatar to the receiver avatar via the transaction route in the metaverse. The transaction component 126 further enables the payment avatar to retrieve the transaction packet data displayed on one or more billboards during its travel using one or more decryption keys. As the payment avatar is embedded with the intent of the transaction, the payment avatar may prevent other digital avatars or fraudsters from entering the transaction route while traveling. Further, during the payment avatar's travel from the sender avatar to the receiver avatar, the payment avatar eventually creates its complete structure while retrieving transaction packet data. Upon retrieving the transaction packet data from all the billboards, the payment avatar may be in a fully structured form indicating the payment avatar that all the packet data is accurately retrieved.

Upon reaching the receiver's location or the receiver avatar, the transaction component 126 is configured to execute the transaction based on the intent of the transaction and retrieved transaction packet data. The transaction component 126 transfers funds from the customer's bank account to the receiver.

If any transaction failure is identified, the payment avatar may travel back through the transaction route and determine the reasons for the failure. For example, the funds could be transferred to an incorrect person instead of transferring to the desired receiver. In that case, the transaction component 126 marks the transaction with a meta-reverse tag on the incorrect receiver's account. The meta-reverse tag may be an automatic hold/lock of the transaction amount and indicates that the amount is to be recovered/settled. Similarly, if the initial customer request was for a transfer of $10, but the executed transaction transfers $100 to the receiver, the transaction will be identified as a failure. The system can prevent the receiver from using the $100 and the transaction is reversed. Any other indications that data has been tampered with or other suspicious activity can cause a transaction to be deemed a failure.

Figure 3:
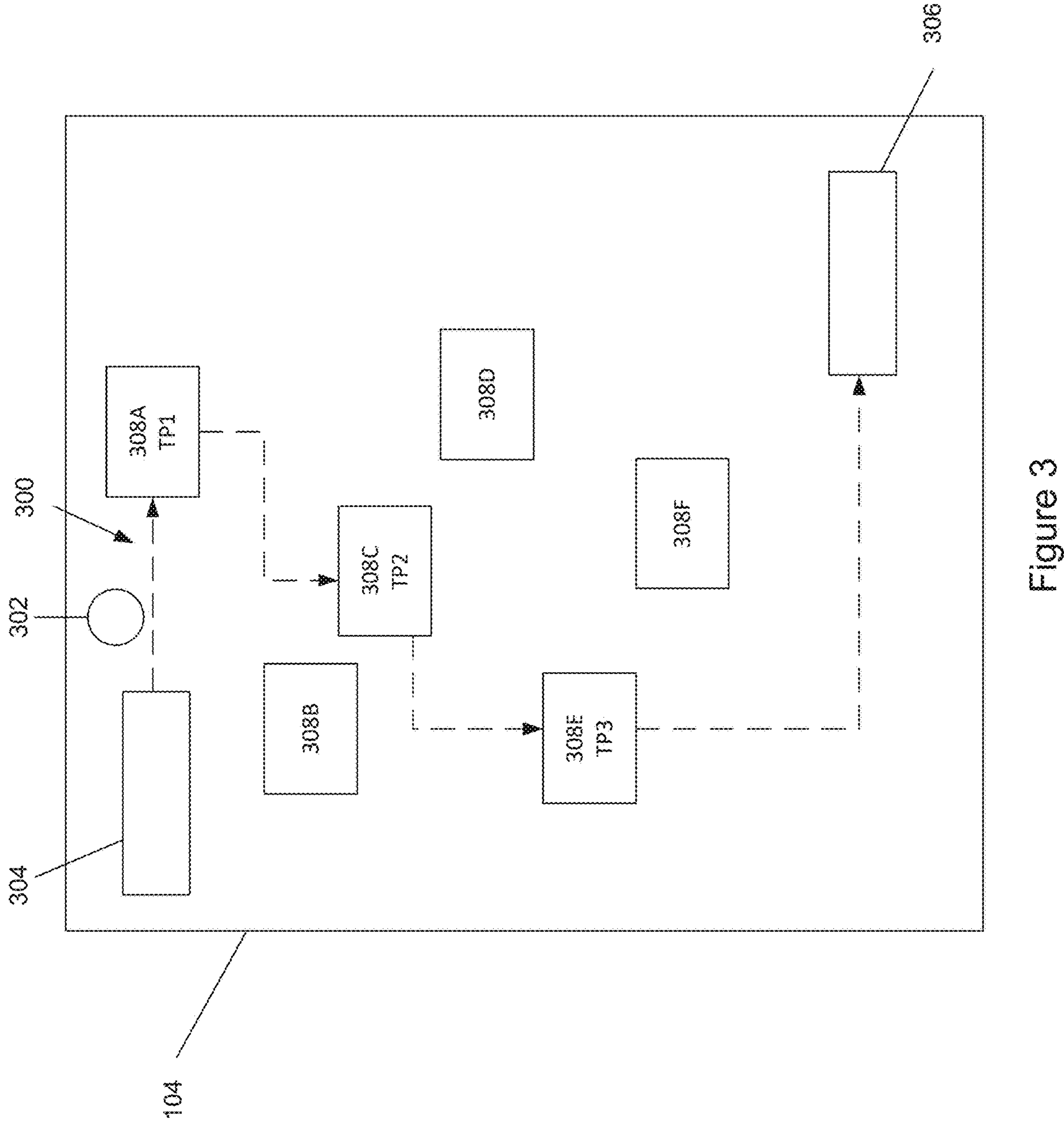
FIG. 3 depicts an exemplary transaction route for transferring funds in the metaverse platform of the system of FIG. 1.

FIG. 3 depicts a payment avatar 302 taking an exemplary virtual transaction route 300 within the metaverse platform 104 from a sender avatar 304 to a receiver avatar 306. There may be a plurality of digital billboards 308A-308F that can potentially be along the optimal route determined by the optimal route determination component 124 and that can display transaction packet data in encrypted form. These billboards may be viewable by any entity in the metaverse platform 104, but the data on the billboards can only be accessed with the decryption keys carried by the payment avatar 302.

As shown in FIG. 3, the transaction route 300 may not go directly between the sender avatar 304 and the receiver avatar 306 and may not go in any established or predictable order. For example, the payment avatar 302 may only initially know to first travel to billboard 308A. At billboard 308A, the payment avatar 302 can use a first decryption key to unlock the data on billboard 308A, which may include both a first portion of the transaction packet data TP1 and the next billboard to which the payment avatar 302 should travel (i.e., billboard 308C).

At the next billboard 308C on the transaction route 300, the payment avatar 302 can use a different decryption key to access a second portion of the transaction packet data TP2 and the next travel location (i.e., billboard 308E). In this example, the final portion of the transaction packet data TP3 is acquired at billboard 308E, which will provide the payment avatar 302 with the complete transaction packet data and the location of the receiver avatar 306. Although described as having been divided into three portions (TP1, TP2, TP3), it should be understood that the transaction packet data can be divided into greater or fewer portions. Upon reaching the receiver avatar 306, the payment avatar 302 can execute the transaction.

Figure 4:
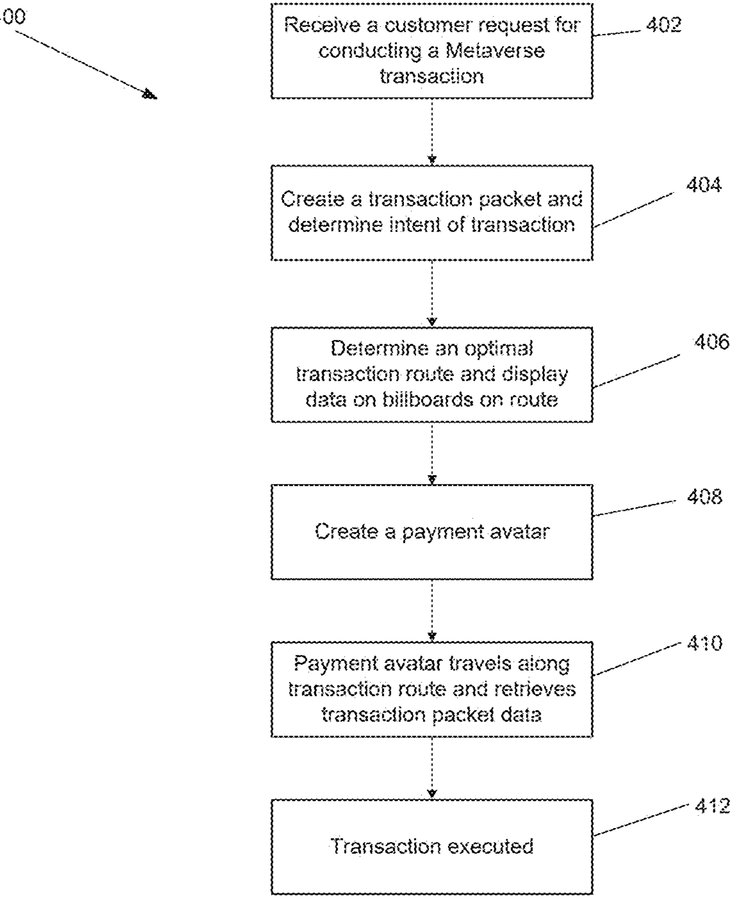
FIG. 4 depicts a flowchart of method steps for transferring funds in a metaverse platform with the system of FIG. 1.

FIG. 4 depicts a flowchart of method steps 400 for use for transferring funds in a metaverse platform with the system of FIG. 1.

At step 402, the system receives a customer request to conduct a metaverse transaction. The bank customer may initiate the request to transfer funds in the metaverse platform from the customer's bank account to a beneficiary/receiver's bank account. The system further receives customer input which includes receiver data and transaction data. The request could be, for example, to pay another individual having an account with the bank $50 from the customer's bank account.

At step 404, the system creates a transaction packet using the customer's input and determines the intent of the transaction. For example, the transaction packet may include receiver data such as the destination address, bank account number, bank IFSC code, and the like as well as source data. The system determines the intent of the transaction using transaction type and receiver type (for example, merchant, family member, or individual). For example, in the above-scenario of the $50 payment, the intent of the transaction is to provide a payment to another individual. At this point, all details for the transaction are included in the transaction packet, but the transaction packet is highly encrypted such that it is not readable by or accessible to any entity.

At step 406, the system determines an optimal transaction route for the requested transaction using an AI/ML model. The AI/ML model may analyze sender data/location and receiver data/location and determine the optimal route based on the analysis. This can include dividing the transaction packet data into multiple transaction packets each including only a portion of the data necessary to execute the transaction. This prevents the full details of the transaction from being accessed by any unauthorized party. The system further displays the transaction packet data in an encrypted form on one or more billboards on the transaction route.

At step 408, the system creates a payment avatar by embedding it with the intent of the transaction. The payment avatar may be a digital avatar capable of traveling from a sender avatar associated with the requesting customer to the receiver avatar associated with the beneficiary on the metaverse platform. The payment avatar may be created using an onion-layered structure and provided with one or more decryption keys to decrypt the transaction packet data. The onion-layered structure, for example, may include multiple layers where each higher layer comprises one or more private keys to decrypt the one or more decryption keys stored in lower layers. In one embodiment, the payment avatar may be created as an incomplete/partially structured avatar that holds the intent of the transaction and the decryption keys.

At step 410, the system enables the payment avatar to retrieve the transaction packet data using one or more decryption keys. The payment avatar travels from the sender to the receiver via the transaction route and retrieves the transaction packet data displayed on the billboards. In the process of retrieving transaction packet data by the payment avatar, the system eventually creates a complete structure of the payment avatar which indicates to the avatar that the data retrieved is correct and accurate. In addition to acquiring additional transaction data at each billboard along the transaction route, each billboard may provide information on where the payment avatar is to travel next (i.e., another billboard or to the sender once the payment avatar has all transaction data). The transaction route may be able to be dynamically changed if suspicious activity is detected along route, such as an attempt to access the transaction data on a billboard without the proper encryption key.

At step 412, the system executes the transaction upon the payment avatar reaching the receiver on the metaverse platform. For instance, the system conducts the transaction based on the retrieved packet data and the intent of the transaction. Upon executing the transaction, the system may deactivate the payment avatar. If the system identifies the transaction as a wrong transaction, the system marks a meta-reverse tag on the transaction, indicating that the amount needs to be reversed/settled.

Although described herein as a transaction including a single payment avatar containing a single transaction packet, in some circumstances a single transaction can be divided into multiple payment avatars and/or multiple transaction packets. For example, for a transaction over a threshold dollar amount multiple payment avatars can be created each corresponding to a portion of the dollar amount.

Figure 5:
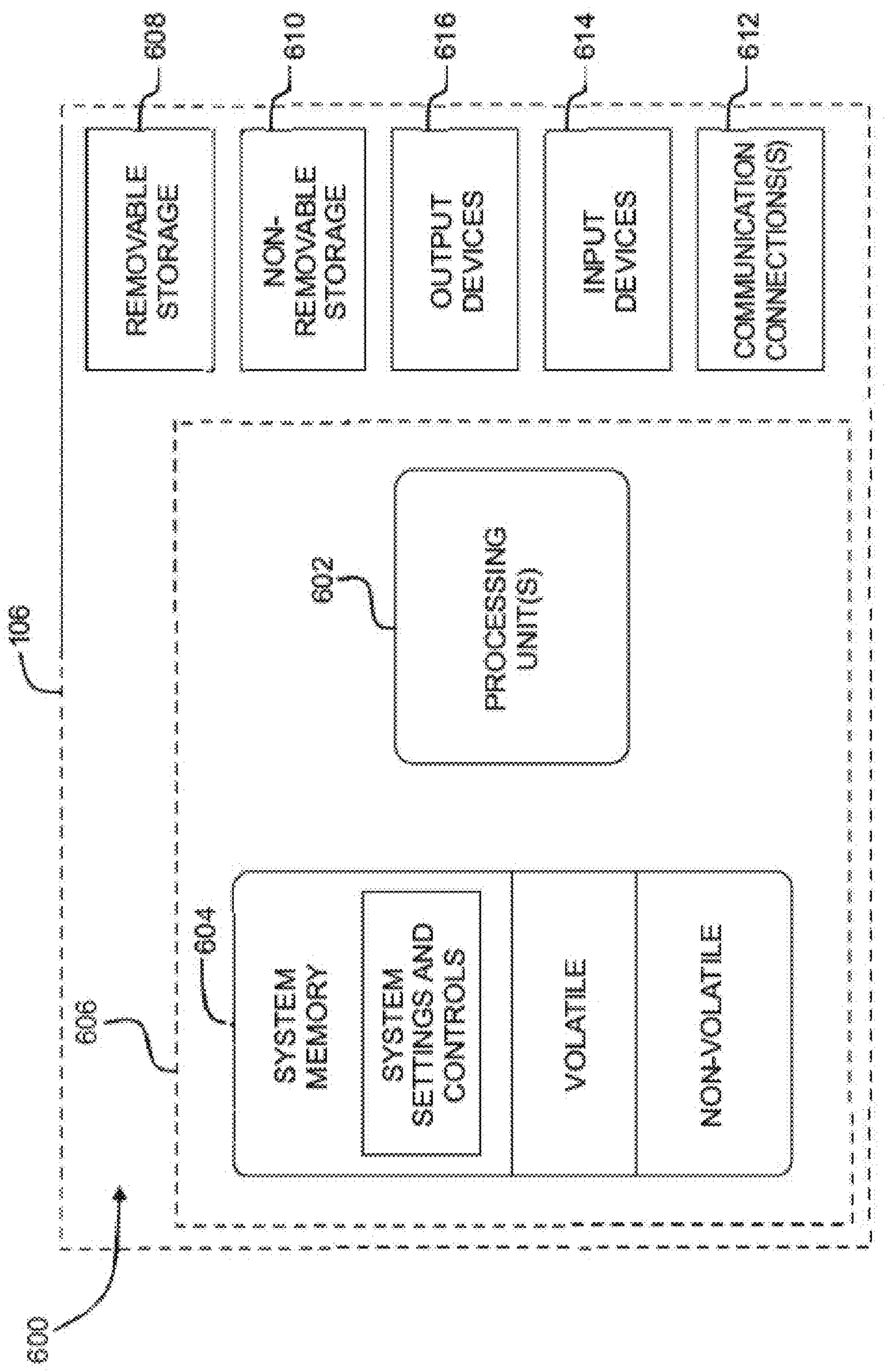
FIG. 5 depicts example components of the server device of FIG. 1.

FIG. 5 depicts one example of the components of the server device 106 on which one or more of the present examples can be implemented. This is only one example of a suitable operating environment and is not intended to suggest any limitation as to the scope of use or functionality. Other well-known computing systems, environments, and/or configurations that can be suitable for use include, but are not limited to, personal computers, server computers, hand-held or laptop devices, multiprocessor systems, microprocessor-based systems, programmable consumer electronics such as smart phones, network PCs, minicomputers, mainframe computers, tablets, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, instructions to control the eject the samples, move the stage, or perform other methods disclosed herein) can be volatile (such as RAM), non-volatile (such as ROM, flash memory, etc.), or some combination of the two. This most basic configuration is illustrated in FIG. 5 by dashed line 606. Further, operating environment 600 can also include storage devices (removable, 608, and/or non-removable, 610) including, but not limited to, magnetic or optical disks or tape. Similarly, environment 600 can also have input device(s) 614 such as touch screens, keyboard, mouse, pen, voice input, etc., and/or output device(s) 616 such as a display, speakers, printer, etc. Also included in the environment can be one or more communication connections 612, such as LAN, WAN, point to point, Bluetooth, RF, etc.

Operating environment 600 typically includes at least some form of computer readable media. Computer readable media can be any available media that can be accessed by processing unit 602 or other devices having the operating environment. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, solid state storage, or any other tangible medium which can be used to store the desired information. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. A computer-readable device is a hardware device incorporating computer storage media.

The operating environment 600 can be a single computer operating in a networked environment using logical connections to one or more remote computers. The remote computer can be a personal computer, a server, a router, a network PC, a peer device or other common network node, and typically includes many or all of the elements described above as well as others not so mentioned. The logical connections can include any method supported by available communications media. Such networking environments are commonplace in offices, enterprise-wide computer networks, intranets and the Internet.

In some examples, the components described herein include such modules or instructions executable by operating environment 600 that can be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some examples, operating environment 600 is part of a network that stores data in remote storage media for use by the operating environment 600.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For example, while certain technologies described herein were primarily described in the context of queueing structures, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Having described the preferred aspects and implementations of the present disclosure, modifications and equivalents of the disclosed concepts may readily occur to one skilled in the art. However, it is intended that such modifications and equivalents be included within the scope of the claims which are appended hereto.

What is claimed is:

1. A method of conducting a financial transaction in a metaverse platform, comprising:

receiving a request from a customer to conduct the financial transaction in the metaverse platform;

creating a transaction packet including details of the financial transaction contained in the request;

dividing the transaction packet into a plurality of transaction packet portions;

determining a transaction route in the metaverse platform from a sender avatar representing the customer to a receiver avatar representing a receiver of the financial transaction;

displaying the details of the financial transaction in the transaction packet in encrypted format on one or more digital billboards along the transaction route;

creating a payment avatar including one or more decryption keys for decrypting the details of the financial transaction in the transaction packet displayed on the one or more digital billboards, wherein the payment avatar includes an onion-layered structure with multiple layers, wherein each higher layer of the onion-layered structure comprises one or more private keys to decrypt the one or more decryption keys stored in lower layers, and wherein each of the plurality of transaction packet portions is displayed on a separate billboard of the one or more digital billboards, and wherein data on the one or more digital billboards can only be accessed with the one or more decryption keys carried by the payment avatar;

enabling the payment avatar to travel along the transaction route to retrieve the details of the financial transaction in the transaction packet displayed on the one or more digital billboards using the one or more decryption keys, wherein a different decryption key of the one or more decryption keys is used to obtain each of the plurality of transaction packet portions displayed on the one or more digital billboards, and wherein the payment avatar obtains additional structure at each of the one or more digital billboards such that the payment avatar is a complete structure upon arriving at the receiver avatar; and causing the payment avatar to execute the financial transaction upon arriving at the receiver avatar.

2. The method of claim 1, wherein the transaction route is determined using an artificial intelligence machine learning model.

3. The method of claim 1, wherein the details contained in the request include customer data relating to the customer and receiver data relating to the receiver.

4. The method of claim 3, further comprising determining an intent of the financial transaction based on the receiver data.

5. The method of claim 4, wherein the intent of the financial transaction is embedded in the payment avatar.

6. The method of claim 1, further comprising:

identifying suspicious activity along the transaction route; and modifying the transaction route in response to identifying the suspicious activity.

7. A system for conducting a financial transaction in a metaverse platform, comprising:

a processor; and memory encoding instructions which, when executed by the processor, cause the processor to create:

an input-capturing module configured to receive a request from a customer to conduct the financial transaction in the metaverse platform, the input-capturing module configured to create a transaction packet including details of the financial transaction contained in the request and divide the transaction packet into a plurality of transaction packet portions;

a route determination module configured to determine a transaction route in the metaverse platform from a sender avatar representing the customer to a receiver avatar representing a receiver of the financial transaction, the route determination module further displaying the details of the financial transaction in the transaction packet in encrypted format on one or more digital billboards along the transaction route;

an avatar creation module configured to create a payment avatar including one or more decryption keys for decrypting the details of the financial transaction in the transaction packet displayed on the one or more digital billboards, wherein the payment avatar includes an onion-layered structure with multiple layers, wherein each higher layer of the onion-layered structure comprises one or more private keys to decrypt the one or more decryption keys stored in lower layers, and wherein each of the plurality of transaction packet portions is displayed on a separate billboard of the one or more digital billboards, and wherein data on the one or more digital billboards can only be accessed with the one or more decryption keys carried by the payment avatar; and a transaction module configured to enable the payment avatar to travel along the transaction route to retrieve the details of the financial transaction in the transaction packet displayed on the one or more digital billboards using the one or more decryption keys, wherein a different decryption key of the one or more decryption keys is used to obtain each of the plurality of transaction packet portions displayed on the one or more digital billboards, and wherein the payment avatar obtains additional structure at each of the one or more digital billboards such that the payment avatar is a complete structure upon arriving at the receiver avatar, and wherein the transaction module is further configured to cause the payment avatar to execute the financial transaction upon arriving at the receiver avatar.

8. The system of claim 7, wherein the route determination module is configured to determine the transaction route using an artificial intelligence machine learning model.

9. The system of claim 7, wherein the details contained in the request include customer data relating to the customer and receiver data relating to the receiver.

10. The system of claim 9, wherein the input-capturing module is further configured to determine an intent of the financial transaction based on the receiver data.

11. The system of claim 10, wherein the avatar creation module is configured to embed the intent of the financial transaction in the payment avatar.

12. The system of claim 7, wherein the transaction module is further configured to identify suspicious activity along the transaction route and the route determination module is configured to modify the transaction route in response to identifying the suspicious activity.

* * * * *